United States Patent
Krestiannykov et al.

(10) Patent No.: US 11,676,121 B2
(45) Date of Patent: Jun. 13, 2023

(54) SYSTEMS AND METHODS FOR CONTENT MANAGEMENT

(71) Applicant: META PLATFORMS, INC., Menlo Park, CA (US)

(72) Inventors: Volodymyr Krestiannykov, Menlo Park, CA (US); Xiaoyin Qu, Palo Alto, CA (US); Aastha Gupta, Sunnyvale, CA (US); Heping Gao, Issaquah, WA (US); Rennie Hsie Song, San Francisco, CA (US); Shuopeng Yin, Mountain View, CA (US); Bradley Thomas Bushell, San Francisco, CA (US); Tianhui Xu, San Jose, CA (US); Gali Levizky, Sunnyvale, CA (US); Daniel Christian Shum, Redwood City, CA (US); Abhishek Bapna, Mountain View, CA (US); Lior Ben Kereth, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 110 days.

(21) Appl. No.: 15/815,649

(22) Filed: Nov. 16, 2017

(65) Prior Publication Data
US 2018/0300700 A1 Oct. 18, 2018

Related U.S. Application Data

(60) Provisional application No. 62/484,880, filed on Apr. 12, 2017.

(51) Int. Cl.
*G06Q 20/12* (2012.01)
*G06Q 30/0204* (2023.01)
(Continued)

(52) U.S. Cl.
CPC ......... *G06Q 20/1235* (2013.01); *G06F 3/048* (2013.01); *G06F 16/29* (2019.01);
(Continued)

(58) Field of Classification Search
CPC .......... G06Q 20/1235; G06Q 30/0205; G06Q 30/0639; G06Q 50/01; G06Q 50/182;
(Continued)

(56) References Cited

U.S. PATENT DOCUMENTS

| 6,199,076 B1 | 3/2001 | Logan et al. |
| 8,601,596 B2 | 12/2013 | Wu et al. |

(Continued)

FOREIGN PATENT DOCUMENTS

| CN | 101558591 A | 10/2009 | |
| KR | 20030045182 A | * 8/1998 | ............. G11B 27/00 |

(Continued)

OTHER PUBLICATIONS

"Nasheri, Hedi, Addressing Global Scope of Intellectual Property Law, Jan. 2005, pp. 1-93" (Year: 2005).*
(Continued)

*Primary Examiner* — Neha Patel
*Assistant Examiner* — Nilesh B Khatri
(74) *Attorney, Agent, or Firm* — Sheppard Mullin Richter & Hampton LLP

(57) ABSTRACT

Systems, methods, and non-transitory computer-readable media can receive a first content item uploaded by a first user. Content ownership information can be updated to associate the first content item with the first user. The first user can be provided with content item analytics pertaining to the first content item in a content item analytics interface.

19 Claims, 12 Drawing Sheets

(51) Int. Cl.
| | |
|---|---|
| *H04W 4/02* | (2018.01) |
| *G06F 3/048* | (2013.01) |
| *G06Q 50/00* | (2012.01) |
| *G06F 16/29* | (2019.01) |
| *G06F 16/40* | (2019.01) |
| *G06F 16/43* | (2019.01) |
| *G06F 16/9535* | (2019.01) |
| *G06Q 20/14* | (2012.01) |
| *G06Q 30/0601* | (2023.01) |
| *G06Q 50/18* | (2012.01) |
| *H04N 21/854* | (2011.01) |

(52) U.S. Cl.
CPC ............. *G06F 16/40* (2019.01); *G06F 16/43* (2019.01); *G06F 16/9535* (2019.01); *G06Q 20/145* (2013.01); *G06Q 30/0205* (2013.01); *G06Q 30/0639* (2013.01); *G06Q 50/01* (2013.01); *G06Q 50/182* (2013.01); *H04N 21/854* (2013.01); *H04W 4/02* (2013.01)

(58) Field of Classification Search
CPC .......... G06F 16/40; G06F 16/29; G06F 3/048; H04N 21/854; H04W 4/02
See application file for complete search history.

(56) References Cited

U.S. PATENT DOCUMENTS

| | | | |
|---|---|---|---|
| 8,732,168 B2 | 5/2014 | Johnson | |
| 9,210,202 B2 | 12/2015 | Bhaskaran et al. | |
| 9,665,556 B1* | 5/2017 | Sutariya | G06F 40/186 |
| 10,032,145 B1* | 7/2018 | Zack | G06Q 30/0251 |
| 10,387,889 B1* | 8/2019 | Hanna | G06Q 50/01 |
| 10,417,716 B1* | 9/2019 | Kosslyn | G06Q 20/389 |
| 2002/0116249 A1 | 8/2002 | Ellinger et al. | |
| 2003/0037010 A1 | 2/2003 | Schmelzer | |
| 2003/0236679 A1 | 4/2003 | Galves et al. | |
| 2005/0086501 A1 | 4/2005 | Woo et al. | |
| 2005/0154681 A1 | 7/2005 | Schmelzer | |
| 2006/0167807 A1 | 7/2006 | Aydar | |
| 2006/0167813 A1* | 7/2006 | Aydar | G06Q 40/12 705/59 |
| 2006/0167882 A1* | 7/2006 | Aydar | G06Q 20/123 707/999.009 |
| 2006/0294371 A1 | 12/2006 | Fanning | |
| 2007/0130015 A1 | 6/2007 | Starr et al. | |
| 2008/0082381 A1* | 4/2008 | Muller | G06Q 10/10 705/344 |
| 2008/0178302 A1* | 7/2008 | Brock | H04L 63/0263 726/32 |
| 2008/0189283 A1 | 8/2008 | Quoc et al. | |
| 2008/0288653 A1 | 11/2008 | Adams | |
| 2009/0144325 A1 | 6/2009 | Chastagnol et al. | |
| 2009/0328236 A1 | 12/2009 | Schmelzer | |
| 2010/0036759 A1 | 2/2010 | Ben-Yaacov et al. | |
| 2010/0161499 A1 | 6/2010 | Holcombe et al. | |
| 2010/0263020 A1 | 10/2010 | Harrison | |
| 2010/0268600 A1 | 10/2010 | Banko et al. | |
| 2010/0287201 A1 | 11/2010 | Damstra et al. | |
| 2011/0004944 A1 | 1/2011 | Shen | |
| 2012/0078894 A1 | 3/2012 | Jiang et al. | |
| 2012/0173441 A1 | 7/2012 | LaRosa et al. | |
| 2012/0197785 A1 | 8/2012 | Cooper | |
| 2013/0085825 A1 | 4/2013 | Davis et al. | |
| 2013/0110803 A1* | 5/2013 | Mikalsen | G06F 16/9535 707/706 |
| 2013/0117190 A1* | 5/2013 | Wald | G06Q 50/18 705/310 |
| 2013/0232012 A1 | 9/2013 | Yan et al. | |
| 2013/0298151 A1* | 11/2013 | Leske | H04N 7/163 725/25 |
| 2013/0339114 A1* | 12/2013 | Plut | G06Q 50/01 705/14.66 |
| 2014/0259097 A1 | 9/2014 | Brock et al. | |
| 2014/0337778 A1* | 11/2014 | Armitage | G06F 3/0484 715/771 |
| 2015/0154385 A1 | 6/2015 | Chastagnol et al. | |
| 2015/0235013 A1* | 8/2015 | Sundaresan | G06Q 30/0206 705/7.35 |
| 2015/0339295 A1 | 11/2015 | Snibbe et al. | |
| 2016/0283956 A1 | 9/2016 | Plagge | |
| 2016/0308730 A1 | 10/2016 | Ibrahim et al. | |
| 2017/0092319 A9 | 3/2017 | Brock et al. | |
| 2017/0193022 A1* | 7/2017 | Xu | G06F 16/24556 |
| 2017/0279757 A1 | 9/2017 | Kereth | |
| 2017/0337621 A1 | 11/2017 | Peters | |
| 2017/0371962 A1 | 12/2017 | Bilobrov | |
| 2017/0371963 A1 | 12/2017 | Bilobrov | |
| 2017/0372142 A1 | 12/2017 | Bilobrov | |
| 2018/0152763 A1 | 5/2018 | Barlaskar et al. | |
| 2019/0190966 A1 | 6/2019 | Decoret et al. | |

FOREIGN PATENT DOCUMENTS

| | | |
|---|---|---|
| WO | 2013169644 | 11/2013 |
| WO | 2016049194 A1 | 3/2016 |

OTHER PUBLICATIONS

Online Piracy in Numbers—Facts and Statistics [Infographic], Nov. 1, 2011, Go-Gulf.com, pp. 1-9 (Year: 2011).*
Pedram Sameni, Patexia Insight 8: 25 Most Litigated Patents Responsible for 6% of All Lawsuits, Aug. 24, 2016, Patexia, pp. 1-3 (Year: 2016).*
Online Piracy in Numbers—Facts and Statistics [infographic], Nov. 1, 2011, pp. 1-7 (Year: 2011).*
U.S. Appl. No. 15/394,420, filed Dec. 29, 2016.
International Application No. PCT/US2017/062404, International Search Report and Written Opinion dated Feb. 21, 2018.
European Patent Application No. 18160199.8, Search Report dated Apr. 6, 2018.
Mikal, "Youtube's Inability to Split Ad Revenue Between Audio & Video Copyright Holders", The Indie Filmmaker Blog, Mar. 31, 2017 (Year: 2017), pp. 1-3.
"Monetization Techniques—Localizing Beyond Language," The Pollfish Blog, Sep. 5, 2015, 4 pages.
Titlow J.P., "How YouTube is Fixing its Most Controversial Feature," Fast Company & Inc., Sep. 13, 2016, pp. 1-13.
Office Action dated Jan. 4, 2023 for Chinese Application No. 201780091230.5, filed Nov. 17, 2017, 10 pages.

* cited by examiner

SYSTEMS AND METHODS FOR CONTENT MANAGEMENT

CROSS-REFERENCE TO RELATED APPLICATIONS

This application claims priority to U.S. Provisional Patent Application No. 62/484,880, filed on Apr. 12, 2017 and entitled "SYSTEMS AND METHODS FOR CONTENT MANAGEMENT", which is incorporated in its entirety herein by reference.

FIELD OF THE INVENTION

The present technology relates to content maintained by a social networking system. More particularly, the present technology relates to content analysis and content management of a social networking system.

BACKGROUND

Today, people often utilize computing devices (or systems) for a wide variety of purposes. Users can use their computing devices, for example, to interact with one another, create content, share content, and access content. In some cases, content items can include postings from members of a social networking system. The postings may include text and media content items, such as images, videos, and audio. The postings may be published to the social networking system for consumption by others. A user can utilize his or her computing device to access the social networking system, and can provide, post, share, and access various content items via the social networking system.

SUMMARY

Various embodiments of the present disclosure can include systems, methods, and non-transitory computer readable media configured to receive a first content item uploaded by a first user. The first content item can be determined to match a first reference content item for which content ownership information is available. The content ownership information indicates that the first reference content item is associated with a first content owner. A content ownership dispute can be initiated between the first user and the first content owner.

In an embodiment, it is determined that the first user is a known content publisher for which content ownership information is maintained.

In an embodiment, the initiating the content ownership dispute occurs based on the determining that the first user is a known content publisher for which content ownership information is maintained.

In an embodiment, it is determined that both the first user and the first content owner are content owners of the first content item. Content ownership information for the first reference content item is updated based on the content ownership dispute.

In an embodiment, the determining that both the first user and the first content owner are content owners of the first content item comprises determining that the first user is a content owner of the first content item in a first geographic region, and the first content owner is a content owner of the first content item in a second geographic region.

In an embodiment, it is determined, based on the content ownership dispute, that the first user is not a content owner of the first content item.

In an embodiment, the determining that the first user is not a content owner of the first content item is based on failure of the first user to respond to notification of the content ownership dispute.

In an embodiment, an unauthorized user dispute is initiated between the first user and the first content owner based on the determining that the first user is not a content owner of the first content item.

In an embodiment, it is determined that the first content item matches a second reference content item for which content ownership information is available, the content ownership information indicating that the second reference content item is associated with a second content owner.

In an embodiment, a content ownership dispute is initiated between the first user and the second content owner.

Various embodiments of the present disclosure can include systems, methods, and non-transitory computer readable media configured to receive revenue for a first content item. It can be determined, based on content ownership information, that the first content item is associated with a plurality of content owners. The revenue can be allocated between the plurality of content owners based on the content ownership information.

In an embodiment, the revenue is divided into a plurality of geographic region revenues, each geographic region revenue associated with a geographic region of a plurality of geographic regions.

In an embodiment, one or more content owners associated with the first content owner are identified in each geographic region of the plurality of geographic regions based on the content ownership information.

In an embodiment, the first content item comprises a video portion and an audio portion.

In an embodiment, each geographic region revenue is divided into an audio revenue and a video revenue.

In an embodiment, half of each geographic region revenue is allocated to the audio revenue, and half of each geographic region revenue is allocated to the video revenue.

In an embodiment, for a first geographic region, the audio revenue for the first geographic region is divided evenly between one or more audio rights holders for the first content item in the first geographic region, and the video revenue for the first geographic region is divided evenly between one or more video rights holders for the first content item in the first geographic region.

In an embodiment, each geographic region revenue is determined based on revenue criteria associated with a geographic region.

In an embodiment, the revenue criteria comprises a price and a payment condition.

In an embodiment, the payment condition comprises at least one of: a number of viewers that view an advertisement, a number of viewers that view a content item, or a number of viewers that take an action with respect to an advertisement.

Various embodiments of the present disclosure can include systems, methods, and non-transitory computer readable media configured to receive a first content item uploaded by a first user. The first content item can be determined to match a first reference content item for which content ownership information is available. The content ownership information indicates that the first reference content item is associated with a first content owner. An unauthorized user dispute can be initiated between the first user and the first content owner based on a determination that the first content item may include an unauthorized use of the first reference content item.

In an embodiment, the first reference content item is associated with a second content owner, and the method further comprises initiating a second unauthorized user dispute between the first user and the second content owner.

In an embodiment, it is determined that the first content item matches a second reference content item for which content ownership information is available, the content ownership information indicating that the second reference content item is associated with a second content owner.

In an embodiment, a second unauthorized user dispute is initiated between the first user and the second content owner.

In an embodiment, a remedy selection is received from the first content owner from a plurality of remedy selection options.

In an embodiment, the remedy selection options comprise at least one of: removing the first content item, modifying the first content item, or monetizing the first content item.

In an embodiment, the remedy selection is automatically carried out based on the unauthorized user dispute.

In an embodiment, it is determined that the first user is not a known content publisher for which content ownership information is maintained.

In an embodiment, the initiating the unauthorized user dispute occurs based on the determining that the first user is not a known content publisher for which content ownership information is maintained.

In an embodiment, it is determined that the first user is a known content publisher for which content ownership information is maintained. The initiating the unauthorized user dispute occurs based on failure of the first user to demonstrate content ownership with regard to the first content item.

Various embodiments of the present disclosure can include systems, methods, and non-transitory computer readable media configured to receive a first content item uploaded by a first user. Content ownership information can be updated to associate the first content item with the first user. The first user can be provided with content item analytics pertaining to the first content item in a content item analytics interface.

In an embodiment, the content item analytics comprise revenue information for the first content item.

In an embodiment, the revenue information comprises revenue information for a plurality of geographic regions.

In an embodiment, the content item analytics comprise ownership information.

In an embodiment, the ownership information comprises details regarding rights of the first user in the first content item.

In an embodiment, the ownership information comprises details regarding other content owners that own rights in the first content item.

In an embodiment, the content item analytics comprise unauthorized use information for the first content item.

In an embodiment, the unauthorized use information comprises unauthorized use information for a plurality of geographic regions.

In an embodiment, the content item analytics comprise dispute results information for the first content item.

In an embodiment, the content item analytics interface comprises content item analytics for a plurality of content items, and the method further comprises ranking the plurality of content items based on a first ranking criteria.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
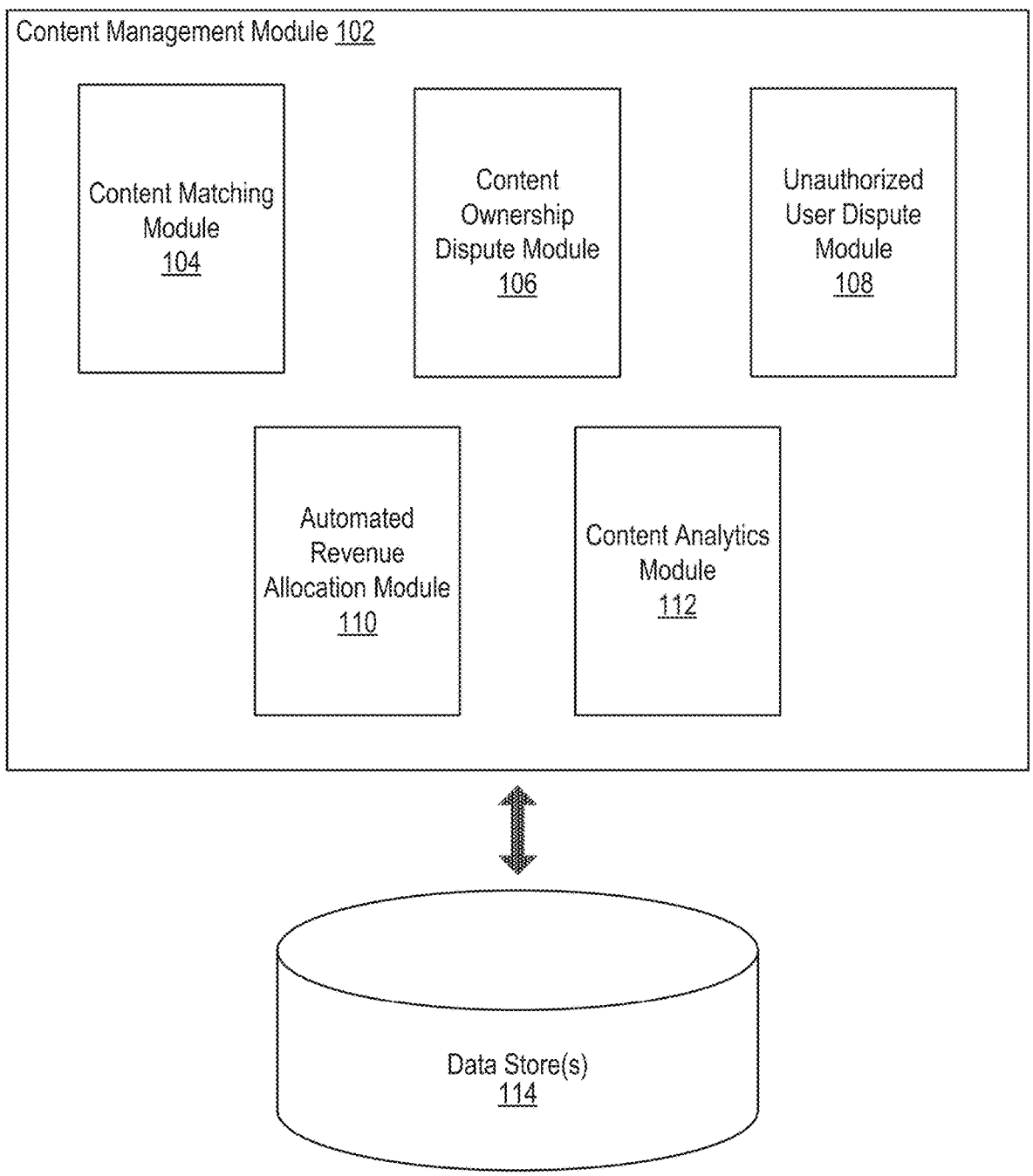
FIG. 1 illustrates an example system including a content management module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Systems and Methods for Content Management

Today, people often utilize computing devices (or systems) for a wide variety of purposes. Users can use their computing devices, for example, to interact with one another, create content, share content, and access content. In some cases, content items can include postings from members of a social networking system. The postings may include text and media content items, such as images, videos, and audio. The postings may be published to the social networking system for consumption by others. A user can utilize his or her computing device to access the social networking system, and can provide, post, share, and access various content items via the social networking system.

Content items may be broadcast through a content provider. Content providers may broadcast content items through various broadcast media (e.g., Internet). For example, content items owned by one or more content owners (i.e., rights holders) can be encoded and distributed by a content provider, such as a social networking system, over the Internet to computing devices of users for access by the users. In some instances, an unauthorized entity may attempt to improperly share a content item belonging to a content owner through a social networking system. For example, the unauthorized entity may upload a content item to the social networking system for broadcast to other users without authorization to do so from the content owner.

Under conventional approaches, it can be difficult to detect such unauthorized use of content items. This is particularly true given the enormous amount of content items that can be shared by certain content providers, such as social networking systems, through their respective broadcast platforms. Such problems are exacerbated by the ease with which users can create multiple accounts on or upload multiple copies of unauthorized content items to social networking systems to try to avoid detection. Furthermore, in networked environments in which multiple users can publish the same content item, it can be difficult to identify which entities are content owners or rights holders for a content item and which entities have created or uploaded unauthorized copies of the content item. When unauthorized copies of content items uploaded to a social networking system are detected, it can also be a challenge to determine the appropriate course of action to take in such situations. This is particularly true when rights to a content item are owned by multiple rights holders. Accordingly, conventional approaches may not be effective in addressing these and other problems arising in computer technology.

An improved approach rooted in computer technology overcomes the foregoing and other disadvantages associated with conventional approaches specifically arising in the realm of computer technology. In general, a plurality of reference content items and content ownership information associated with the plurality of reference content items are maintained. The content ownership information can associate each reference content item with one or more content owners. In various embodiments, when a content item is uploaded to a content provider by a user, digital information of the content item can be analyzed and compared with digital information of the plurality of reference content items to determine whether the content item matches a reference content item. If one or more digital processing techniques determine that the content item matches a reference content item, this can be an indication that the content item may be an unauthorized use of a content item that is owned by one or more content owners, i.e., the one or more content owners associated with the reference content item. As such, a content provider, such as a social networking system, can automatically provide an electronic notification to the one or more content owners associated with the reference content item to notify them of the uploaded content item. A dispute mediated by the content provider can be automatically initiated between the user and the one or more content owners. The dispute may take the form of, for example, a content ownership dispute and/or an unauthorized user dispute. In various embodiments, revenues generated by a particular content item can automatically be allocated to one or more content owners based on content ownership information. For example, revenues may be allocated based on geographic revenues generated, the scope of ownership of various content owners in various geographic regions (e.g., ownership of an audio portion or a video portion of a content item in particular geographic regions), and the like. In certain embodiments, content item analytics can be provided to a content owner. Content item analytics can include, for example, content item revenue information, content item ownership information, dispute information, unauthorized use information, and the like. More details regarding the present disclosure and the various embodiments are provided herein.

FIG. 1 illustrates an example system 100 including an example content management module 102, according to an embodiment of the present disclosure. The content management module 102 can be configured to maintain content ownership information for a plurality of reference content items. The content ownership information can associate each reference content item with one or more content owners. In some embodiments, the content management module 102 can be implemented by a content provider, such as a social networking system, to manage content items uploaded by users to the social networking system for publication. In various embodiments, when a content item is uploaded to a content provider by a user, the content management module 102 can be configured to analyze the content item and compare digital information of the content item with digital information of the plurality of reference content items to determine whether the content item matches a reference content item. If it is determined through various digital processing techniques that the content item matches a reference content item, this can be an indication that the content item may be an unauthorized use of a content item that is owned by one or more content owners, i.e., the one or more content owners associated with the reference content item. The content management module 102 can be configured to automatically generate an electronic notification for the one or more content owners associated with the reference content item to notify them of the uploaded content item. In various embodiments, the content management module 102 can be configured to automatically initiate and mediate a dispute between the user and the one or more content owners. The dispute may take the form of, for example, a content ownership dispute and/or an unauthorized user dispute. The content management module 102 can also be configured to automatically allocate revenues generated by a particular content item to one or more content owners based on content ownership information. For example, revenues can be automatically allocated based on revenues generated in various geographic regions, content ownership information indicating which content owners own rights to a content item in each geographic region, and content ownership information indicating the scope of rights owned by each content owner in each geographic region. The content management module 102 can also be configured to provide content item analytics to content owners. Content item analytics can include, for example, ownership and revenue information pertaining to various content items, dispute information, and unauthorized use information, as will be described in greater detail below.

As shown in the example of FIG. 1, the content management module 102 can include a content matching module 104, a content ownership dispute module 106, an unauthorized user dispute module 108, an automated revenue allocation module 110, and a content analytics module 112. In some instances, the example system 100 can include at least one data store 114. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the content management module 102 can be implemented in any suitable combinations.

In some embodiments, the content management module 102 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the content management module 102 can be implemented, in part or in whole, as software running on one or more computing devices or systems, such as on a user or client computing device. For example, the content management module 102, or at least a portion thereof, can be implemented as or within an application (e.g., app), a program, or an applet, etc., running on a user computing device or a client computing system, such as the user device 610 of FIG. 6. In another example, the content management module 102, or at least a portion thereof, can be implemented using one or more computing devices or systems that include one or more servers, such as network servers or cloud servers. In some instances, the content management module 102 can, in part or in whole, be implemented within or configured to operate in conjunction with a social networking system (or service), such as the social networking system 630 of FIG. 6. It should be understood that there can be many variations or other possibilities.

The content management module 102 can be configured to communicate and/or operate with the at least one data store 114, as shown in the example system 100. The data store 114 can be configured to store and maintain various types of data. In some implementations, the data store 114 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 114 can store information that is utilized by the content management module 102. For example, the data store 114 can store one or more content items (e.g., reference content items), content ownership information for one or more content items, fingerprints and/or other comparison information for one or more content items, revenue information for a plurality of content items, dispute information for a plurality of content items, dispute enforcement information, and the like. It is contemplated that there can be many variations or other possibilities.

The content matching module 104 can be configured to determine, using various digital processing techniques, whether a content item matches one or more reference content items. In various embodiments, one or more data stores (e.g., data store 114) can maintain a plurality of reference content items, and content ownership information for the plurality of reference content items. The content ownership information can associate each reference content item of the plurality of reference content items with one or more content owners. The content matching module 104 can be configured to determine that a content item uploaded by a user matches, to a threshold degree, a reference content item for which content ownership information is available. As such, in various embodiments, the content matching module 104, by matching a newly uploaded content item to a reference content item for which content ownership information is known, can determine that the newly uploaded content item may be associated with one or more content owners, i.e., the one or more content owners associated with the reference content item.

Content matching can include matching of one or more portions of content items. For example, a first portion of a first content item may match a portion of a first reference content item, a second portion of the first content item may match a portion of a second reference content item, a third portion of the first content item may match a portion of a third reference content item, and so forth. In various embodiments, a content item (including reference content items) may include both an audio portion and a video portion. The audio portion and the video portion may be considered individually and/or in combination for purposes of content matching. For example, the audio portion of the content item may match a first reference content item, and the video portion of the content item may match a second reference content item, or the combination of the audio portion and the video portion in the content item may match another reference content item.

The content matching module 104 can identify matches between content items (e.g., between a newly uploaded content item and one or more reference content items) using a variety of techniques. For example, fingerprinting techniques that generate one or more comparable fingerprints for content items can be used. In various embodiments, content items can be transformed from one domain (e.g., time domain, frequency domain) to another (e.g., frequency domain, time domain) to perform comparisons and matching. Various exemplary content matching techniques are disclosed in U.S. patent application Ser. No. 15/077,840, filed Mar. 22, 2016, entitled "SYSTEMS AND METHODS FOR IDENTIFYING MATCHING CONTENT"; U.S. patent application Ser. No. 15/290,999, filed Oct. 11, 2016, entitled "SYSTEMS AND METHODS FOR IDENTIFYING MATCHING CONTENT"; U.S. patent application Ser. No. 15/291,002, filed Oct. 11, 2016, entitled "SYSTEMS AND METHODS FOR IDENTIFYING MATCHING CONTENT"; U.S. patent application Ser. No. 15/291,003, filed Oct. 11, 2016, entitled "SYSTEMS AND METHODS FOR IDENTIFYING MATCHING CONTENT"; and U.S. patent application Ser. No. 15/394,420, filed Dec. 29, 2016, entitled "SYSTEMS AND METHODS FOR IDENTIFYING MATCHING CONTENT," each of which are incorporated by reference as if fully set forth herein.

In various embodiments, if a newly uploaded content item uploaded by a user matches a reference content item, a dispute may be automatically initiated between the user and one or more content owners associated with the reference content item, as will be described in greater detail below. However, in some embodiments, if a newly uploaded content item uploaded by a user does not match any reference content items, the newly uploaded content item can be considered a new content item for which no ownership information is available. As such, the newly uploaded content item can be stored as a reference content item, and content ownership information can be updated to associate the user as a content owner of the newly uploaded content item/new reference content item.

The content ownership dispute module 106 can be configured to manage or mediate a content ownership dispute based on content item matching, according to an embodiment of the present disclosure. A content ownership dispute, in various embodiments, can be a dispute between two users who have uploaded the same or substantially the same content item (e.g., as determined by automated content matching) to determine ownership rights to the content item. For example, a first user can upload a first content item. It may be determined that the content item does not match any reference content items (e.g., by content matching module 104). As such, the first content item can be stored as a first reference content item, and the first user can be associated with the first reference content item as a content owner. At a later time, a second user can upload a second content item that is the same or substantially the same as the first reference content item. When the second content item is uploaded, it will be determined to match the first reference content item. The content ownership dispute module 106 can be configured to initiate and manage a content ownership dispute between the first user and the second user to settle a potential ownership dispute between the first user and the second user.

It may be possible for a content item to be associated with multiple content owners, each of whom may own different rights with respect to the content item. The different rights with respect to a content item can include, for example, rights in various portions of a content item (e.g., a video portion, an audio portion, etc.) and rights in various geographic regions (e.g., US, Canada, Thailand, etc.) associated with the content item. For example, in various embodiments, one or more content owners may own rights to an audio portion of a content item and one or more different content owners may own rights to a video portion of the content item. Consider the example of a content item in which an audio portion of the content item is background music by a musical artist, and a video portion of the content item is video footage of a dog playing in a pool. The musical artist may own the rights to the audio portion of the content item, while the producer of the footage of the dog playing in a pool may own rights to the video portion of the content item. In various embodiments, different content owners may own rights to a content item in different geographic regions. For example, a musical artist may own rights to an audio portion of a content item in the United States, while a recording studio may own rights to the audio portion of the content item in all non-U.S. countries. Similarly, a video producer may own rights to a video portion of the content item in the U.S., a first investor may own rights to the video portion in European countries, and a second investor may own rights to the video portion in all other countries. Geographic regions can be defined, in various embodiments, by cities, counties, countries, continents, or any other useful grouping of geographic areas.

In certain embodiments and scenarios, a content ownership dispute between two users for a first content item may involve a determination that one user is a rightful content owner of the first content item, and the other user is an unauthorized user that has improperly used and/or shared the first content item. In other embodiments and scenarios, a content ownership dispute between two users for a first content item may involve a determination that both users are rightful content owners of the first content item, with different scopes of ownership or shared ownership. In various embodiments, such scenarios may involve a determination of which rights are owned by a first user and which rights are owned by a second user. The content ownership dispute module 106 can be configured to automatically update content ownership information based on the results of a content ownership dispute. For example, a first user may have been associated with a first reference content item as a content owner. However, after a content ownership dispute, it may be determined that a second user is the rightful content owner, and the first user is not. The content ownership dispute module 106 can be configured to automatically remove the association between the first reference content item and the first user, and to associate the first reference content item with the second user. In another example, a content ownership dispute may conclude with the determination that a first user owns rights to a first reference content item in the U.S., and a second user owns rights to the first reference content item in all Asian countries. The content ownership dispute module 106 can be configured to automatically update content ownership information to reflect these determinations.

In certain embodiments, for a plurality of users, all users (e.g., all users of a social networking system) may be considered potential content owners, and any two users can be involved in a content ownership dispute. In other embodiments, a subset of users (e.g., a subset of users of a social networking system) may be identified as known content producers, and users that are identified as known content producers can be involved in a content ownership dispute. In various embodiments, content ownership information may be maintained for the set of users identified as known content producers, and may not be maintained for users that are not in the set of known content producers. Known content producers can include, for example, musical artists, song writers or composers, entertainment producers or writers, recording or production studios, and other professional content producers.

As discussed above, if an uploading user uploads a content item, the content item may be compared with one or more reference content items to determine if there are any matches. If a match is found, indicating that the content item is already associated with one or more content owners, the content ownership dispute module 106 can be configured to automatically generate an electronic notification to the uploading user notifying the uploading user that the content item is already associated with one or more content owners. Similarly, the content ownership dispute module 106 can be configured to automatically generate an electronic notification to the one or more content owners notifying them that the uploading user has uploaded a content item that, presumably, belongs to the one or more content owners. In various embodiments, the content ownership dispute module 106 can be configured to determine if the uploading user is a known content producer. If the uploading user is a known content producer, the content ownership dispute module 106 can initiate a content ownership dispute between the uploading user and at least some of the one or more content owners. However, in various embodiments, if the uploading user is not a known content producer, rather than a content ownership dispute, an unauthorized user dispute may be initiated, as will be described in greater detail below.

In certain embodiments, if an uploading user chooses not to pursue a content ownership dispute, earlier uploaders and/or current content owners will be presumed to have ownership of the content item. In such cases, the uploading user may subsequently be treated as an unauthorized user, and an unauthorized user dispute may be initiated, as discussed in greater detail below. In certain embodiments, the content ownership dispute module 106 can be configured to provide earlier uploaders and/or current content owners with a presumption of ownership, and later uploaders may be required to provide proof of ownership in order to demonstrate rights in a content item. In certain embodiments, an uploading user may indicate that the uploading user asserts certain rights for a particular content item (e.g., audio rights in the UK), and the content ownership dispute module 106 can be configured to initiate a content ownership dispute only with respect to content owners that match the rights asserted by the user (e.g., one or more content owners that are associated with audio rights for the content item in the U.K.). In certain embodiments, the content ownership dispute module 106 can be configured to initiate a content ownership dispute only with respect to content owners whose rights have been violated and/or infringed by a content item uploaded by a user. For example, a content item may be uploaded to a content provider, but only made available to users in Europe. The content provider may have various content owners owning rights in Europe, North America, Asia, Africa, South America, and Australia. However, the ownership rights of the content owners in North America, Asia, Africa, South America, and Australia have not been violated by the content item, as it is available only in Europe. As such, in certain embodiments, a content ownership dispute may be initiated only with content owners owning rights to the content item in Europe.

The unauthorized user dispute module 108 can be configured to manage a dispute between a content owner and an unauthorized user based on automated content matching, according to an embodiment of the present disclosure. As discussed above with respect to various embodiments of the present disclosure, when a user uploads a content item, the content item can be compared to one or more reference content items. Each reference content item is associated with one or more content owners. As such, if the content item matches a reference content item, it can be understood that the content item may be associated with the one or more content owners associated with the reference content item. If an unauthorized user uploads a content item without authorization from content owners associated with the reference content item, the unauthorized user dispute module 108 may provide the content owners with the ability to take action to address the unauthorized use.

The unauthorized user dispute module 108 can provide content owners with the option to take various actions with regard to a content item uploaded by an unauthorized user. For example, the unauthorized user dispute module 108 can provide content owners with the option of blocking the content item, monetizing the content item, and/or modifying the content item. Blocking the content item can remove the content item that was improperly uploaded by the unauthorized user. Monetizing the content item may provide advertising revenue, when available, to the content owner according to rights held by the content owner in the content item. Modifying the content item can, for example, remove any unauthorized portions of a content item. For example, if the content item uploaded by the unauthorized user is a video captured by the unauthorized user of a dog set against background music that is owned by a content owner, the content owner owns rights to the audio portion of the content item, but not the video portion. As such, the unauthorized user dispute module 108 can allow the unauthorized user to modify the audio portion of the content item so as to remove any dispute between the unauthorized user and the content owner.

When an unauthorized user uploads a content item, the content item can be analyzed to determine whether the content item matches one or more reference content items of a plurality of reference content items. If the content item is determined to match one or more reference content items, the unauthorized user dispute module 108 can query content ownership information to determine one or more content owners associated with the one or more reference content items. The unauthorized user dispute module 108 can electronically notify the unauthorized user and the one or more content owners of the presumably unauthorized content item, and provide them with an opportunity to come to an agreement on their own. If an agreement cannot be reached, the unauthorized user dispute module 108 can initiate an unauthorized user dispute between the user and the one or more content owners. In certain embodiments, the unauthorized user dispute module 108 can be configured to initiate multiple unauthorized user disputes. For example, each unauthorized user dispute can involve the unauthorized user and a respective one of the one or more content owners. The unauthorized user dispute module 108 can provide the unauthorized user with the opportunity to provide an explanation as to why the content item should not be affected by the ownership rights of the content owner (e.g., fair use, evidence that the unauthorized user is the actual rights holder, or that the content owner is not an actual rights holder). If the unauthorized user is unable to demonstrate and/or prove their case, the unauthorized user dispute module 108 can be configured to automatically implement a remedy selected by the content owner (e.g., block, modify, monetize).

In certain embodiments, a content item may match multiple reference content items, and may be determined to be associated with multiple content owners. For example, a content item might include four different songs owned by four different artists, and video clips from various content items owned by multiple content owners. In such scenarios, the unauthorized user dispute module 108 can initiate a single dispute between multiple content owners, or, alternatively, can initiate multiple disputes. In certain embodiments, each unauthorized user dispute may be limited to a dispute between a single unauthorized user and a single content owner.

If multiple content owners are involved in unauthorized user disputes regarding a content item uploaded by an unauthorized user, the remedies sought by the multiple content owners may differ. For example, a first content owner may own rights to the content item in Germany, while a second content owner and a third content owner may jointly own rights to an audio portion of the content item in the U.S., and a fourth content owner may own rights to a video portion of the content item in the U.S. The first content owner may wish to monetize the content item, the second content owner may wish to block the content item, the third content owner may wish to monetize the content item, and the fourth content owner may wish to block the content item. Separate disputes may take place between the unauthorized user and the four content owners. However, some of the remedies sought by the different content owners may conflict with each other. For example, the second content owner and the third content owner share audio rights in the U.S., but one content owner may wish to block and the other may wish to monetize. The third content owner cannot monetize the content item if the content item is blocked/removed. In such scenarios, the unauthorized user dispute module 108 can be configured to give greater priority to certain remedies over others. For example, in this case, the remedy of completely blocking a content item can be considered to be greater in magnitude or severity than the remedy of monetizing. As such, the unauthorized user dispute module 108 can be configured to prioritize and implement the remedy of blocking the audio portion of the content item in the U.S. Remedies may also be limited to a geographic region in which a content owner owns rights. For example, the second, third, and fourth content owners may be able to block the content item in the U.S., but the content item can continue to be played in Germany, and the first content owner can monetize the content item in Germany.

In certain embodiments, the unauthorized user dispute module 108 can be configured to automatically carry out remedies for content owners. For example, if an unauthorized user dispute concludes with a content owner blocking a content item in one or more geographic regions, the unauthorized user dispute module 108 can automatically remove or block the content item in those geographic regions. For example, a social networking system may prohibit users from those geographic regions from accessing the content item. In another example, if an unauthorized user dispute concludes with a content owner requesting modification of a content item uploaded by an unauthorized user, the unauthorized user dispute module 108 can automatically provide the unauthorized user with one or more recommendations for modifying the content item (e.g., replacing an unauthorized audio track with an authorized audio track). In yet another example, if an unauthorized user dispute concludes with a content owner monetizing an unauthorized content item, the unauthorized user dispute module 108 can initiate automatic revenue allocations to the content owner based on revenue generated by the content item and the scope of rights held by the content owner in the content item. In various embodiments, the unauthorized user dispute module 108 can maintain dispute enforcement information reflecting results of an unauthorized user dispute. For example, if a content item is blocked in various regions, the dispute enforcement information can reflect that result. Similarly, if a content item is to be monetized, with revenues from the content item being allocated to various content owners, the dispute enforcement information can account for content ownership information for the content item so that revenues can be allocated accordingly. In various embodiments, dispute enforcement information can also comprise content ownership information. Content ownership information can be updated based on a result of one or more unauthorized user disputes (e.g., by updating a content item to be associated with a user/content owner that was alleged to be an unauthorized user).

The automated revenue allocation module 110 can be configured to automatically allocate revenues generated by a content item to one or more content owners based on content ownership information. As mentioned above, content items may be associated with one or more content owners. Content ownership information detailing associations between content owners and content items may be maintained in one or more data stores (e.g., data store 114). A particular content item may be associated with multiple content owners, each of whom may own different rights with respect to the content item. For example, in various embodiments, different content owners may own rights to an audio portion of a content item and a video portion of the content item. In various embodiments, a content owner may own certain rights to a content item in one geographic region, while other content owners may own rights to the content item in other geographic regions.

These complexities in ownership of a content item can present a challenge in compensating content owners for broadcast of the content item by a content provider. For example, a content item uploaded to a social networking system may generate revenue based on advertisements placed within the content item. However, if the content item is owned by various content owners having different rights, it is not always clear how such revenues should be allocated between the various content owners.

The automated revenue allocation module 110 can be configured to automatically allocate revenues for a content item based on content ownership information associated with the content item. In various embodiments, content ownership information utilized by the automated revenue allocation module 110 may be maintained and/or updated based on results of various content ownership disputes and/or unauthorized user disputes, as discussed above.

Content ownership information for a content item can include content ownership information for the content item in a plurality of geographic regions. The automated revenue allocation module 110 can determine how much of the total revenue for a content item is associated with each geographic region, and can divide the total revenue into multiple geographic region revenues. For example, a content item that has generated $1,000 in revenue may have generated $500 in revenue based on views in the United States, $250 based on views in Canada, and $250 based on views in Mexico. The geographic region revenue associated with each geographic region may be determined based on consumption of the content item in each geographic region.

Geographic region revenues, i.e., the amount of revenue that can be attributed to various geographic regions, may be determined based on revenue criteria. Revenue criteria may differ in different geographic regions. In various embodiments, revenue criteria can comprise a price and a payment condition. For example, for a particular content item, advertisers may pay $5 (price) for every 1,000 users in the U.S. that view an advertisement (payment condition), $7 (price) for every 1,000 users in China that consume the complete content item (payment condition), $10 (price) for every 2,500 users in Italy that click on an advertisement (payment condition), and so forth. Based on these example revenue criteria, if 10,000 U.S. viewers watched the advertisement, $50 of revenue can be associated with the U.S. If 20,000 users in China consumed the content item, $140 of revenue can be associated with China. If 10,000 users in Italy clicked on the advertisement, $40 of revenue can be associated with Italy.

Once revenue has been divided by geographic region, revenue/payments can be automatically allocated to rights holders of the content item in each geographic region based on content ownership information. In certain embodiments, geographic region revenues associated with a particular geographic region are split evenly between all content owners that hold rights to the content item in the geographic region. In various embodiments, if a content item contains both an audio portion and a video portion, revenues for the content item are first split in half, such that half the revenue is allocated to audio rights holders (i.e., audio revenue) and half the revenue is allocated to video rights holders (i.e., video revenue). Audio revenues for a particular geographic region can be allocated evenly between all audio rights holders of a content item in the geographic region, and video revenues for the particular geographic region can be allocated evenly between all video rights holders of the content item in the geographic region.

In certain embodiments, revenue for a content item may be allocated between one or more content owners and an unauthorized user. For example, an unauthorized user may upload a content item in which one or more content owners own rights. The unauthorized user may own a portion of the content item, while the one or more content owners own one or more other portions of the content item. For example, consider an example multimedia file in which an unauthorized user adds to his or her home video background music owned by a musical artist. The musical artist may own rights to the audio portion of the multimedia file, while the unauthorized user may maintain rights in the video portion of the multimedia file. Any revenue generated by the multimedia file can be allocated such that half of revenues (i.e., audio revenue) go to the musical artist and half of revenues (i.e., video revenues) go to the unauthorized user. In another example, if it is determined that a content item uploaded by an unauthorized user belongs to a content owner in the U.S., but does not belong to any content owners outside of the U.S., all U.S.-based revenue can be allocated to the content owner, while all other geographic region revenues can be allocated to the unauthorized user. In certain embodiments, the unauthorized user may be treated as a content owner of a content item for any portions and/or geographic regions for which there is no content owner information for the content item. While some examples have been discussed for purposes of explanation, it should be understood that various other scenarios are contemplated by the present disclosure, and that an unauthorized user can receive revenue commensurate with the rights that he or she maintains in any portion of a content item.

The content analytics module 112 can be configured to provide various content item analytics or metrics to content owners. The content analytics module 112 can provide, through a user interface of a computing device of a content owner, information relating to various content items associated with the content owner. The content owner can use the content item analytics, for example, to determine what types of content to produce or acquire in the future, which geographic regions to target with various types of content, which geographic regions to avoid, how to deal with unauthorized use of content items, and the like.

In various embodiments, content item analytics can include revenue information associated with one or more content items owned by a content owner. Revenue information can include any information relating to revenue for one or more content items owned by a content owner. This can include, for example, total revenue for all content items owned by the content owner, revenue broken down by content item, total revenue in each geographic region, and the like.

In various embodiments, content item analytics can include ownership information for one or more content items owned by a content owner. Ownership information can include any information relating to ownership of one or more content items owned by a content owner. For example, ownership information can include details regarding rights the content owner holds in each content item the content owner partially or entirely owns (e.g., whether the content owner owns audio rights or video rights, or both, and in which geographic regions), details regarding other content owners that own rights in content items the content owner partially owns (e.g., which other content owners own what rights in which geographic regions), and the like.

In various embodiments, content item analytics can include geographic region information for one or more content items owned by a content owner. Geographic region information can include, for example, revenue generated in different geographic regions, which content items and/or rights the content owner owns in different geographic regions, the number of unauthorized uses that have occurred in different geographic regions, the number of disputes that have taken place in different geographic regions and their results, and the like.

In various embodiments, content item analytics can include unauthorized use information for one or more content items owned by a content owner. Unauthorized use information can include, for example, information pertaining to unauthorized uses of content owned by the content owner. Unauthorized uses of content owned by the content owner may be determined, for example, based on content matching and various dispute procedures that are executed in response to the content matching, as discussed herein.

In various embodiments, content item analytics can include dispute information for one or more content items owned by a content owner. Dispute information can include, for example, information pertaining to any content disputes that the content owner has been involved in. This can include, for example, the number of disputes, the number of disputes in different geographic regions, results for the various disputes, etc. Disputes can include disputes over ownership with other content owners, and/or disputes with unauthorized users who have used a content item without permission.

In various embodiments, the content analytics module 112 can be configured to allow a user to rank, order, and/or filter content item analytics based on any of the criteria discussed above. For example, a user can rank, order, and/or filter a list of geographic regions based on revenue, number of disputes, number of unauthorized uses, etc. In another example, a user can rank, order, and/or filter a list of content items based on revenue, number of disputes, number of unauthorized uses, etc. Many variations are possible.

Figure 2A:
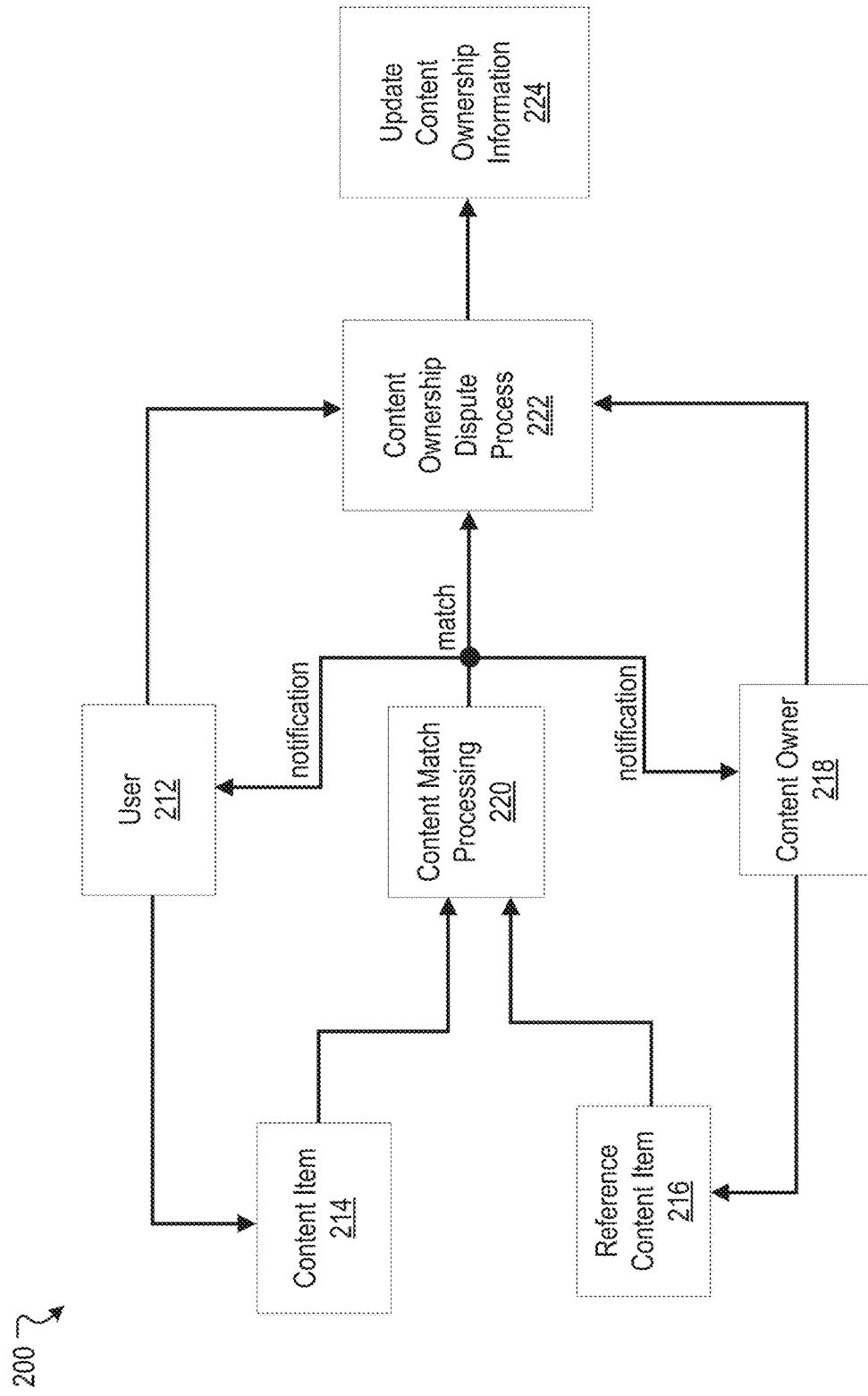
FIG. 2A illustrates an example block diagram associated with automated management of a content ownership dispute, according to various embodiments of the present disclosure.

FIG. 2A illustrates an example functional block diagram 200 associated with automated management of a content ownership dispute, according to an embodiment of the present disclosure. In the example shown, a user 212 can upload a content item 214 to a content provider, such as a social networking system, for publication. A reference content item 216 owned at least in part by a content owner 218 can be maintained by the content provider. Content ownership information relating to the reference content item 216, including its association with the content owner 218, can be maintained by the content provider. At block 220, content match processing can be performed on the content item 214 and the reference content item 216 to determine a match between the content item 214 and the reference content item 216. A match can be determined with respect to one or more content types of the content item 214, such as video portions or audio portions. As discussed herein, a match can be determined based on various digital processing techniques. Upon detection of a match, an electronic notification can be automatically provided to the user 212 and an electronic notification can be automatically provided to the content owner 218. The notifications can inform the user 212 and the content owner 218 about the existence of a potential conflict over rights in the content item 214. In response to a determination of the match, at block 222, a content ownership dispute process can be automatically initiated to allow the user 212 and the content owner 218 to attempt to resolve the conflict. At block 224, results of the content ownership dispute process, such as a determination of rightful ownership of the content item 214, can be used to update the content ownership information, as appropriate.

Figure 2B:
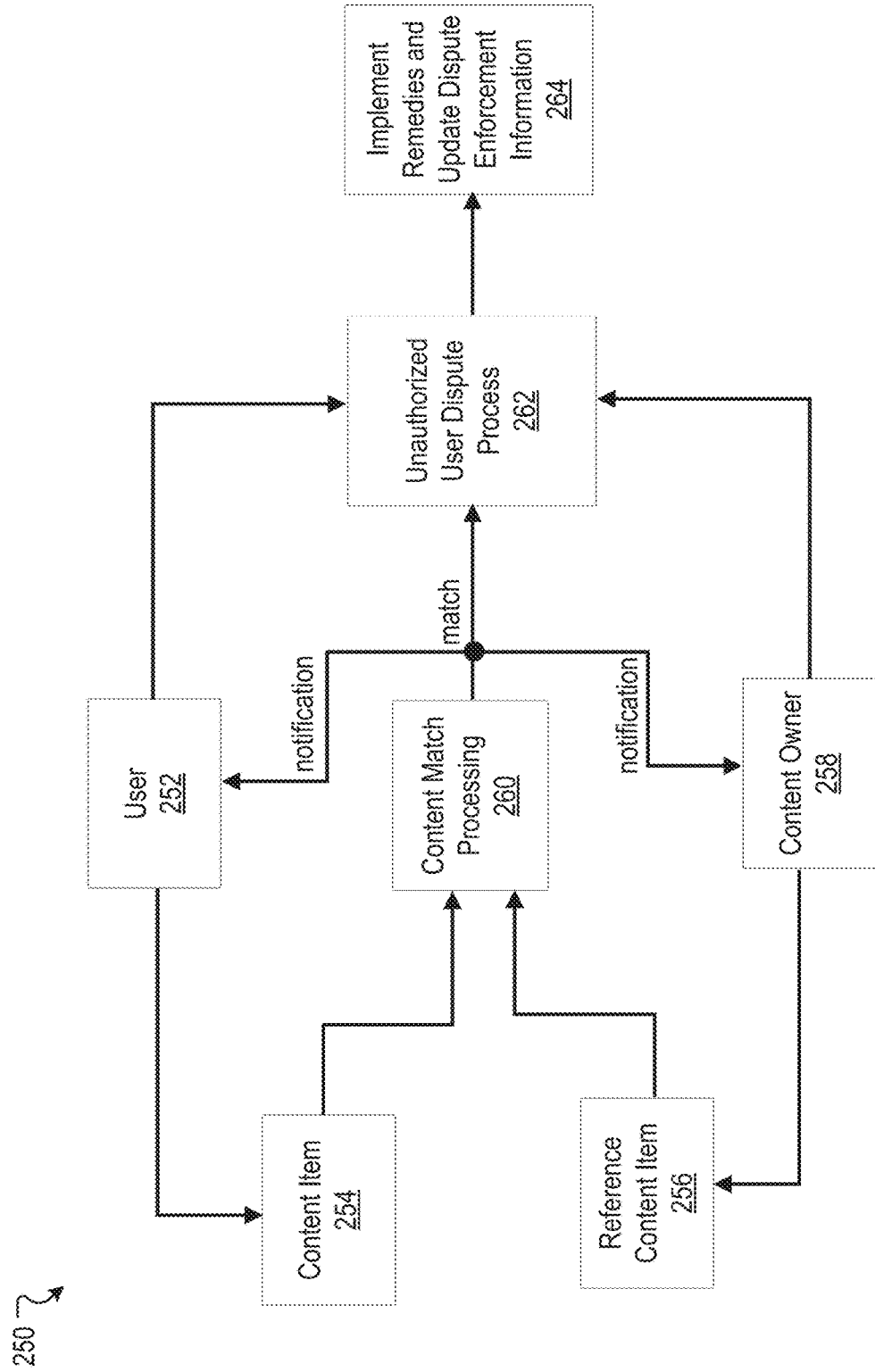
FIG. 2B illustrates an example block diagram associated with automated management of an unauthorized user dispute, according to various embodiments of the present disclosure.

FIG. 2B illustrates an example functional block diagram 250 associated with automated management of an unauthorized user dispute, according to an embodiment of the present disclosure. In the example shown, a user 252 can upload a content item 254 to a content provider, such as a social networking system, for publication. A reference content item 256 owned at least in part by a content owner 258 can be maintained by the content provider. Content ownership information relating to the reference content item 256, including its association with the content owner 258, can be maintained by the content provider. At block 260, content match processing can be performed on the content item 254 and the reference content item 256 to determine a match between the content item 254 and the reference content item 256. A match can be determined with respect to one or more content types of the content item 254, such as video portions or audio portions. As discussed herein, a match can be determined based on various digital processing techniques. Upon detection of a match, an electronic notification can automatically be provided to the user 252 and an electronic notification can automatically be provided to the content owner 258. The notifications can inform the user 252 and the content owner 258 about rights of the content owner 258 in the reference content item 256, and potential unauthorized use of the reference content item 256 in the content item 254. In response to a determination of the match, at block 262, an unauthorized user dispute process can be automatically initiated to allow the user 252 and the content owner 258 to attempt to resolve the conflict. At block 264, any applicable remedies can be automatically implemented (e.g., blocking, modifying, and/or monetizing of content item 254), and dispute enforcement information can be updated, as appropriate. In certain embodiments, updating the dispute enforcement information can comprise updating content ownership information, for example, if the user 252 is determined to be a content owner of either the content item 254 or the reference content item 256.

Figure 3A:
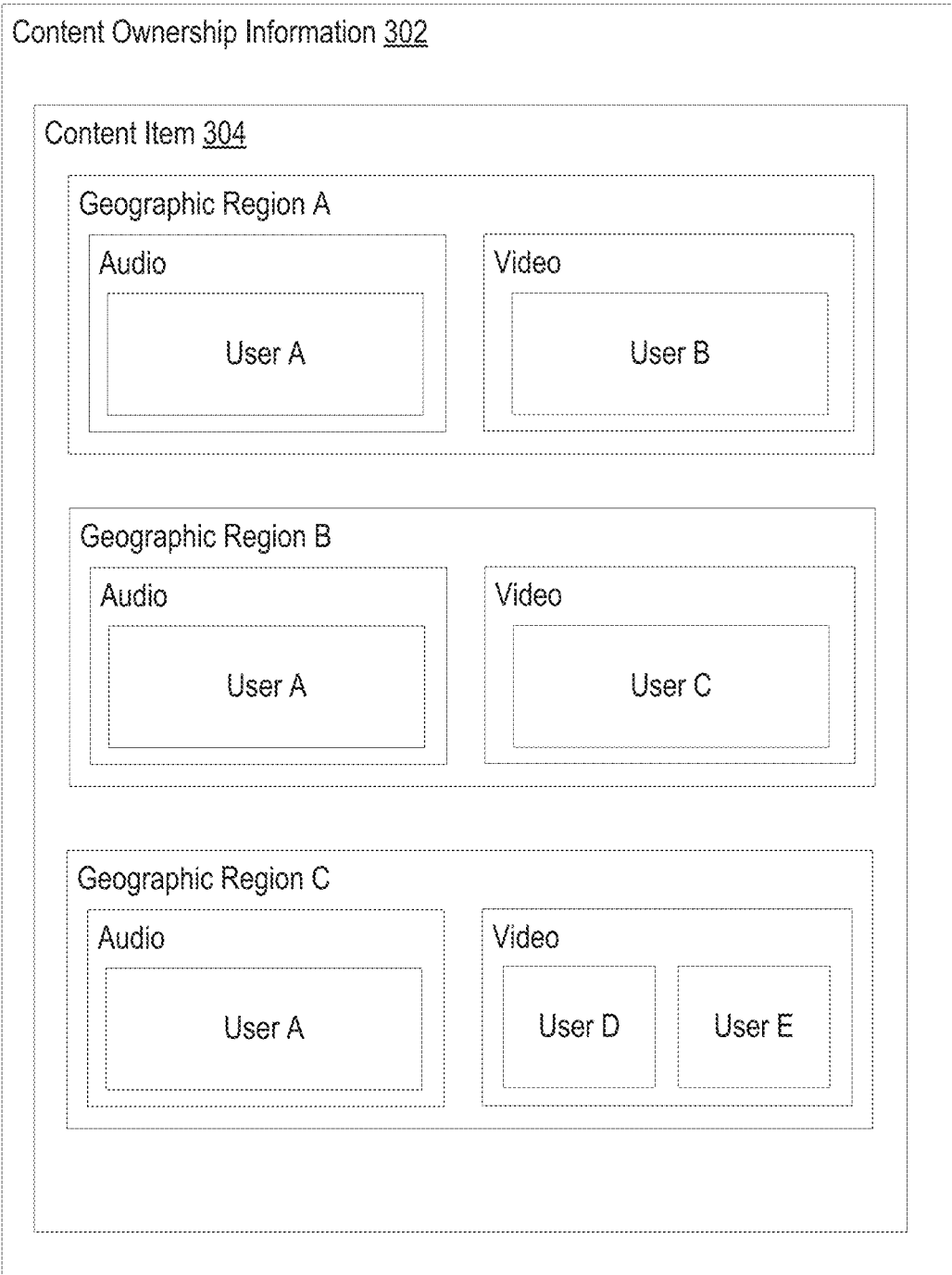
FIGS. 3A-B illustrate an example scenario associated with automated allocation of content item revenue based on content ownership information, according to various embodiments of the present disclosure.
Figure 3B:
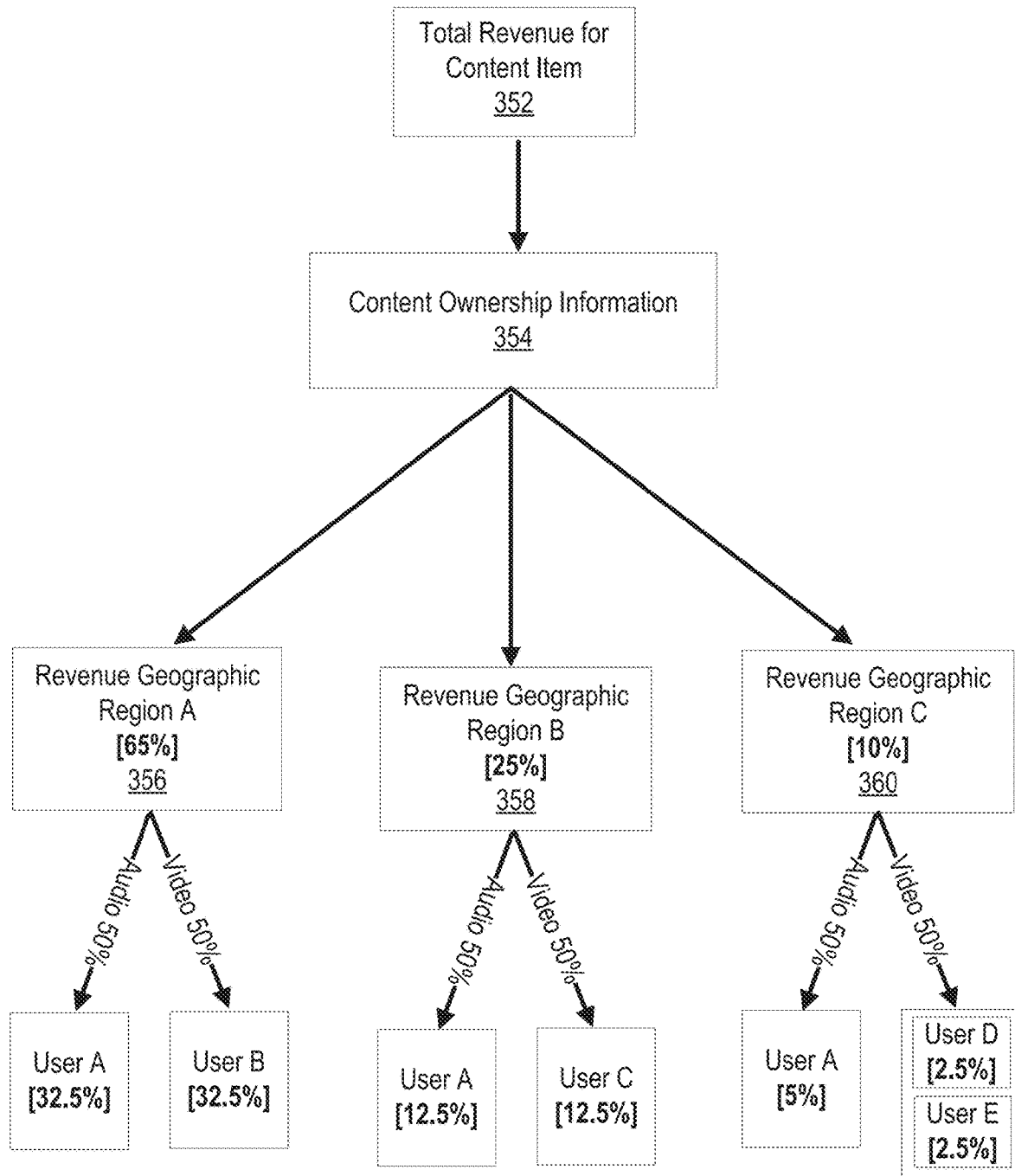

FIGS. 3A and 3B illustrate example scenarios 300, 350, associated with automated allocation of content item revenue, according to an embodiment of the present disclosure. In FIG. 3A, the example scenario 300 includes content ownership information 302 for a content item 304. The content item 304 has an audio portion and a video portion. In Geographic Region A, the audio portion is owned by User A, and the video portion is owned by User B. In Geographic Region B, the audio portion is again owned by User A, and the video portion is owned by User C. In Geographic Region C, the audio portion is again owned by User A, and the video portion is owned by two entities, User D and User E.

In FIG. 3B, revenues for the content item 304 of FIG. 3A are automatically allocated between the various content owners of the content item 304. The example scenario 350 begins with determining total revenue for the content item at block 352. At block 354, content ownership information can be used to determine the various content owners that have rights in the content item 304. Revenue is split between the various geographic regions based on how much revenue was generated in each geographic region. In the example scenario 350, it is determined that Geographic Region A is responsible for 65% of the revenue (block 356), Geographic Region B is responsible for 25% of the revenue (block 358), and Geographic Region C is responsible for 10% of the revenue (block 360). Each geographic region revenue is divided evenly (i.e., 50%/50%) into audio revenue and video revenue for each geographic region. If there are multiple audio rights holders for a content item in a geographic region, audio revenue for the geographic region can be distributed evenly among all audio rights holders in the geographic region. Similarly, if there are multiple video rights holders for a content item in a geographic region, video revenue for the geographic region can be distributed evenly among all video rights holders in the geographic region.

In the example scenario 350, the 65% allocation for Geographic Region A is divided in half for audio and video rights holders. User A, the only audio rights holder in Geographic Region A, receives half of the 65%, i.e., 32.5%, and User B, the only video rights holder in Geographic Region A, receives the same. The 25% revenue associated with Geographic Region B is split in half between the only audio rights holder (User A) and the only video rights holder (User C). Half the 10% revenue associated with Geographic Region C is distributed to the only audio rights holder in Geographic Region C, User A. The video rights in Geographic Region C are owned by both User D and User E. As such, the 5% video revenue in Geographic Region C is split evenly between User D and User E.

Figure 4:
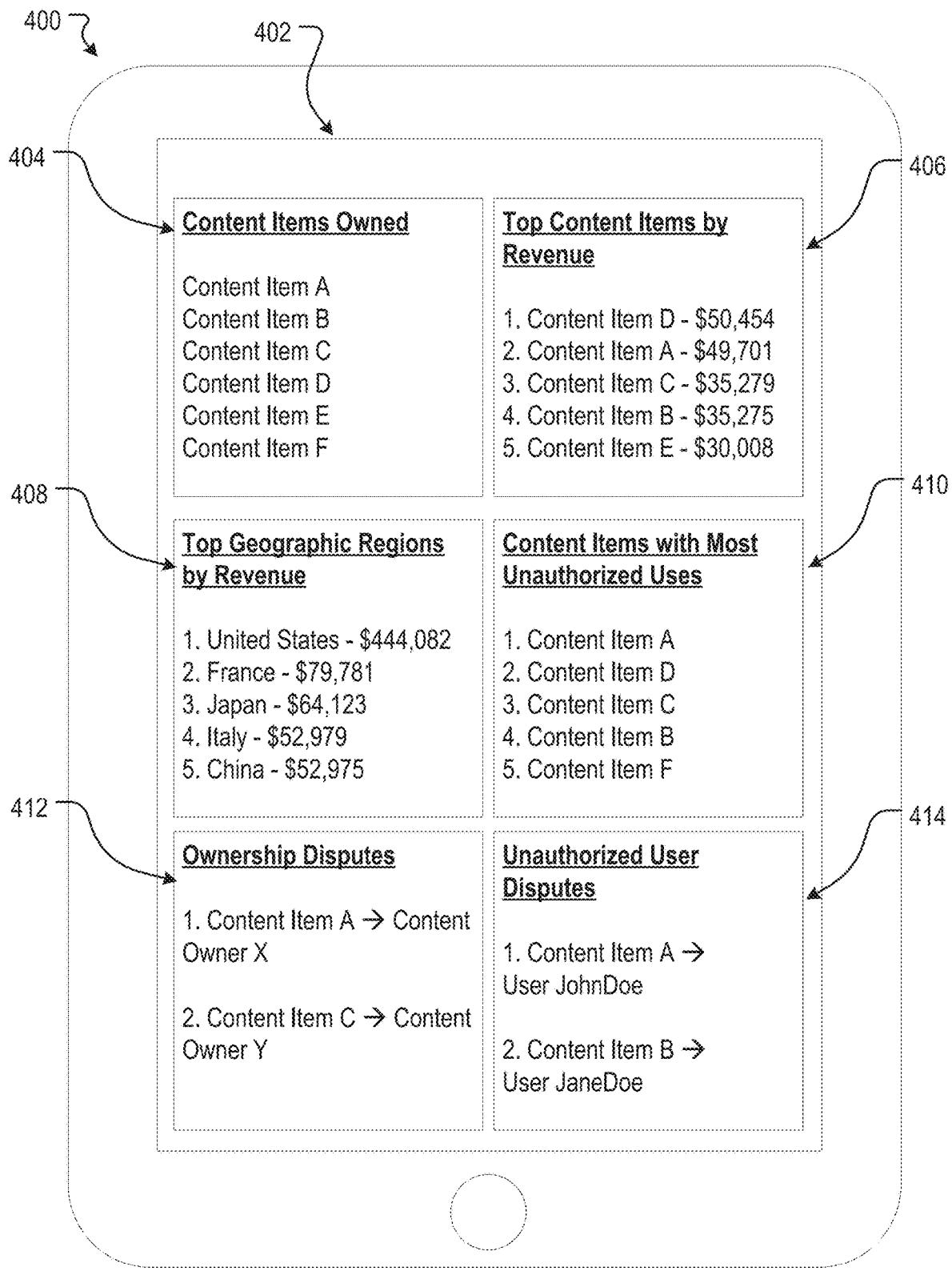
FIG. 4 illustrates an example scenario associated with provision of a content analytics interface, according to an embodiment of the present disclosure.

FIG. 4 illustrates an example scenario 400 associated with provision of content item analytics, according to an embodiment of the present disclosure. The example scenario 400 includes a content analytics interface 402 displayed on a display of a computing device of a content owner. The content analytics interface 402 includes various windows (or sections) that present various content item analytics to the content owner. In the example scenario 400, the content analytics interface 402 includes a first window 404 that lists all of the content items owned by the content owner. The content analytics interface 402 includes a second window 406 that displays a ranked list of content items associated with the content owner ranked by revenue, and the revenue generated by each content item. A third window 408 displays a ranked list of geographic regions (e.g., countries) ranked by revenue generated in each geographic region by content items associated with the content owner. A fourth window 410 displays a ranked list of content items owned by the content owner with the most unauthorized uses. A fifth window 412 displays a list of ownership disputes that the content owner is currently involved in and/or has been involved in in the past, and another content owner involved in each ownership dispute. A sixth window 414 displays a list of unauthorized user disputes that the content owner is currently involved in and/or has been involved in in the past, as well as an uploading user involved in each unauthorized user dispute.

In certain embodiments, windows may act as links to additional information. For example, if the content owner selects the first window 404, the content owner may be provided with additional content item ownership information, such as details regarding the scope of rights held by the content owner in each content item. Or, if the content owner selects the fifth window 412, the content owner may be presented with additional ownership dispute information, such as the results of any past ownership disputes.

In certain embodiments, items listed in the various windows may act as links to additional information. For example, if the content owner clicks on a link for "Content Item C" in window 404, the content owner may be presented with details about Content Item C, such as the scope of rights held by the content owner in Content Item C, revenue generated by Content Item C, geographic region revenues generated by Content Item C, any unauthorized uses or disputes involving Content Item C, and the like. Similarly, if the content owner clicks on the item "United States" in window 408, the content owner may be presented with additional details regarding content items owned by the content owner in the United States, such as a ranked list of content items by revenue in the United States. It should be appreciated that there can be many other variations or possibilities.

Figure 5A:
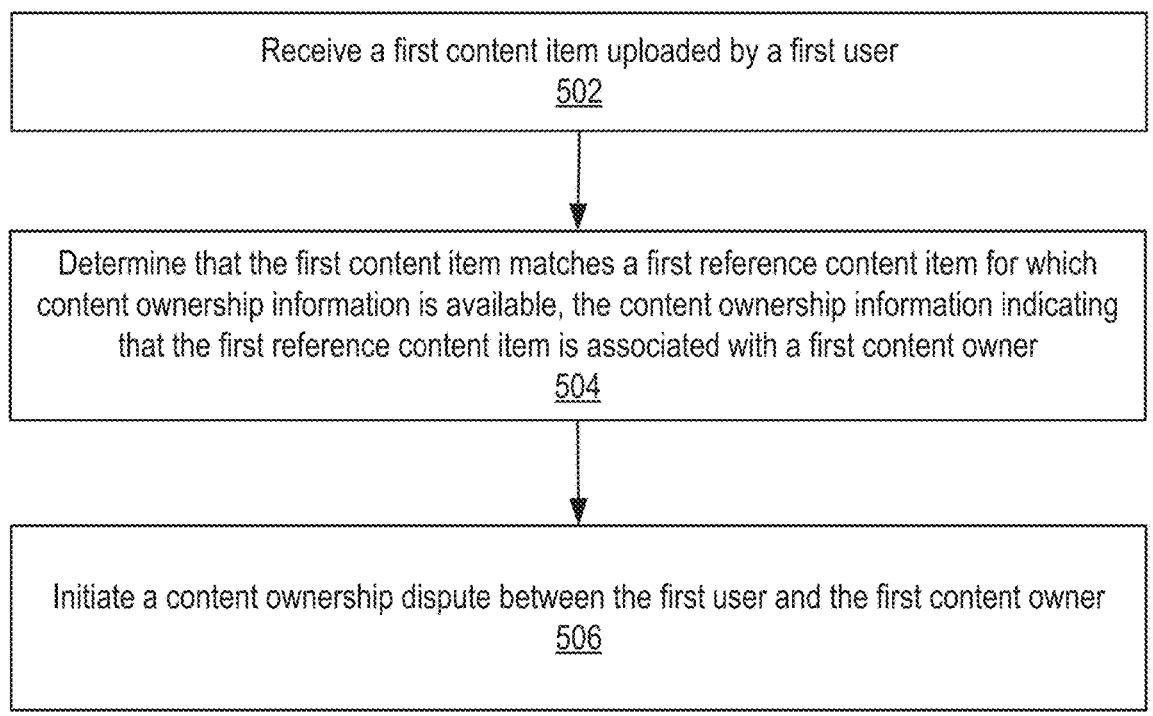
FIG. 5A illustrates an example method associated with initiating a content ownership dispute based on automated content matching, according to an embodiment of the present disclosure.

FIG. 5A illustrates an example method 500 associated with initiating a content ownership dispute based on automated content matching, according to an embodiment of the present disclosure. It should be appreciated that there can be additional, fewer, or alternative steps performed in similar or alternative orders, or in parallel, within the scope of the various embodiments discussed herein unless otherwise stated.

At block 502, the example method 500 can receive a first content item uploaded by a first user. At block 504, the example method 500 can determine that the first content item matches a first reference content item for which content ownership information is available, the content ownership information indicating that the first reference content item is associated with a first content owner. At block 506, the example method 500 can initiate a content ownership dispute between the first user and the first content owner.

Figure 5B:
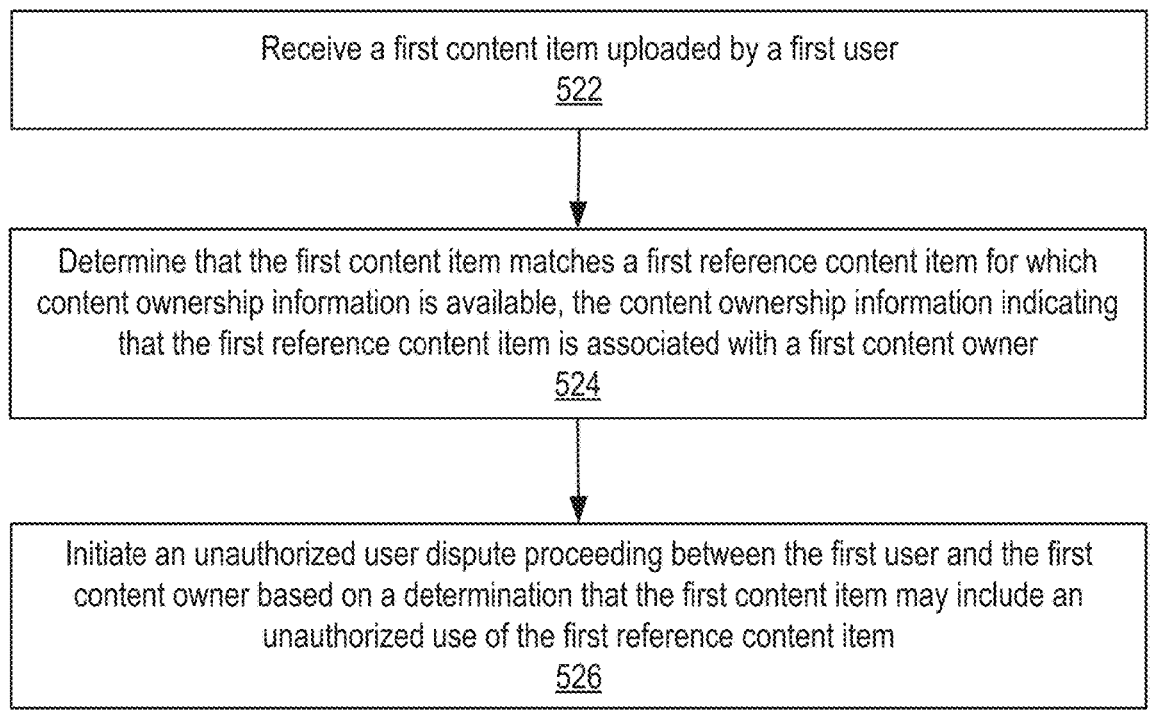
FIG. 5B illustrates an example method associated with initiating an unauthorized user dispute based on automated content matching, according to an embodiment of the present disclosure.

FIG. 5B illustrates an example method 520 associated with initiating an unauthorized user dispute based on automated content matching, according to an embodiment of the present disclosure. It should be appreciated that there can be additional, fewer, or alternative steps performed in similar or alternative orders, or in parallel, within the scope of the various embodiments discussed herein unless otherwise stated.

At block 522, the example method 520 can receive a first content item uploaded by a first user. At block 524, the example method 520 can determine that the first content item matches a first reference content item for which content ownership information is available, the content ownership information indicating that the first reference content item is associated with a first content owner. At block 526, the example method 520 can initiate an unauthorized user dispute between the first user and the first content owner based on a determination that the first content item may include an unauthorized use of the first reference content item.

Figure 5C:
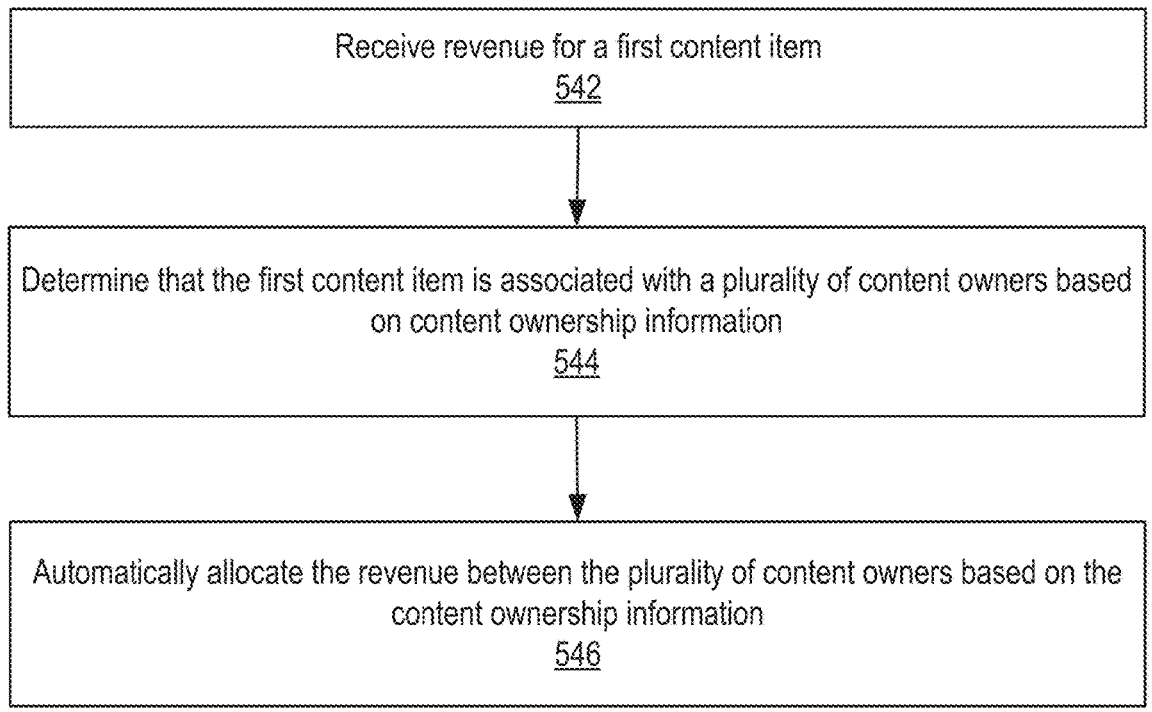
FIG. 5C illustrates an example method associated with automated content item revenue allocation, according to an embodiment of the present disclosure.

FIG. 5C illustrates an example method 540 associated with automated content item revenue allocation, according to an embodiment of the present disclosure. It should be appreciated that there can be additional, fewer, or alternative steps performed in similar or alternative orders, or in parallel, within the scope of the various embodiments discussed herein unless otherwise stated.

At block 542, the example method 540 can receive revenue for a first content item. At block 544, the example method 540 can determine that the first content item is associated with a plurality of content owners based on content ownership information. At block 546, the example method 540 can automatically allocate the revenue between the plurality of content owners based on the content ownership information.

Figure 5D:
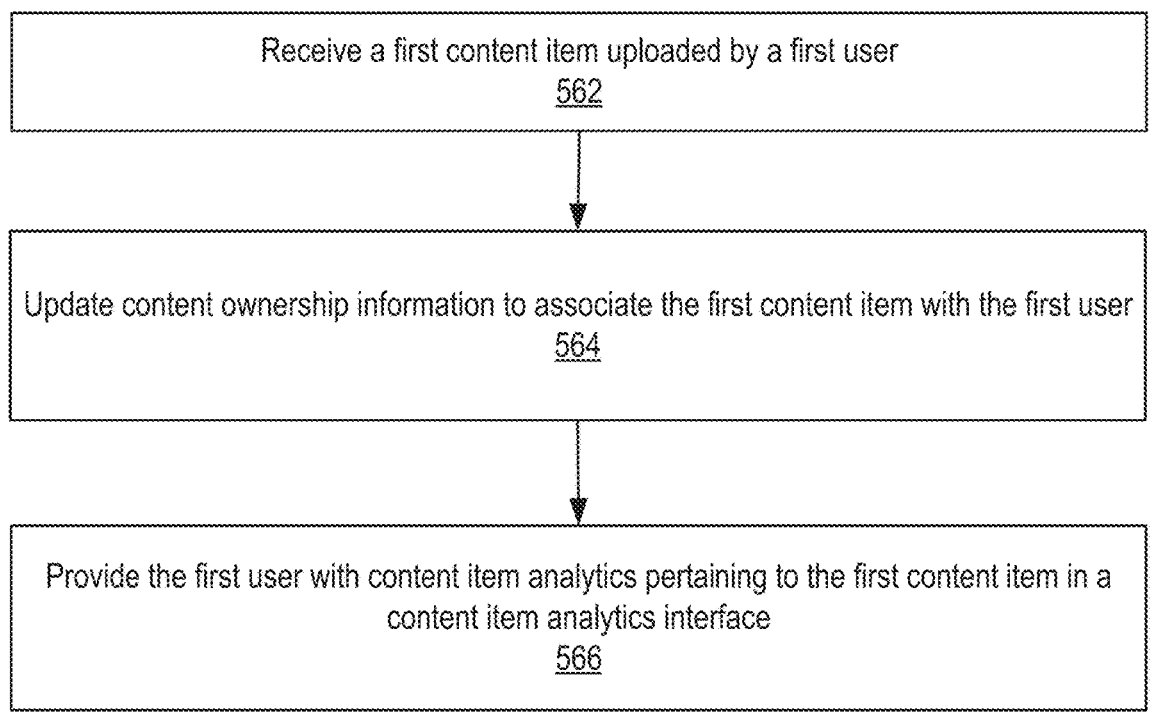
FIG. 5D illustrates an example method associated with providing content item analytics, according to an embodiment of the present disclosure.

FIG. 5D illustrates an example method 560 associated with provision of content item analytics, according to an embodiment of the present disclosure. It should be appreciated that there can be additional, fewer, or alternative steps performed in similar or alternative orders, or in parallel, within the scope of the various embodiments discussed herein unless otherwise stated.

At block 562, the example method 560 can receive a first content item uploaded by a first user. At block 564, the example method 560 can update content ownership information to associate the first content item with the first user. At block 566, the example method 560 can provide the first user with content item analytics pertaining to the first content item in a content item analytics interface.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
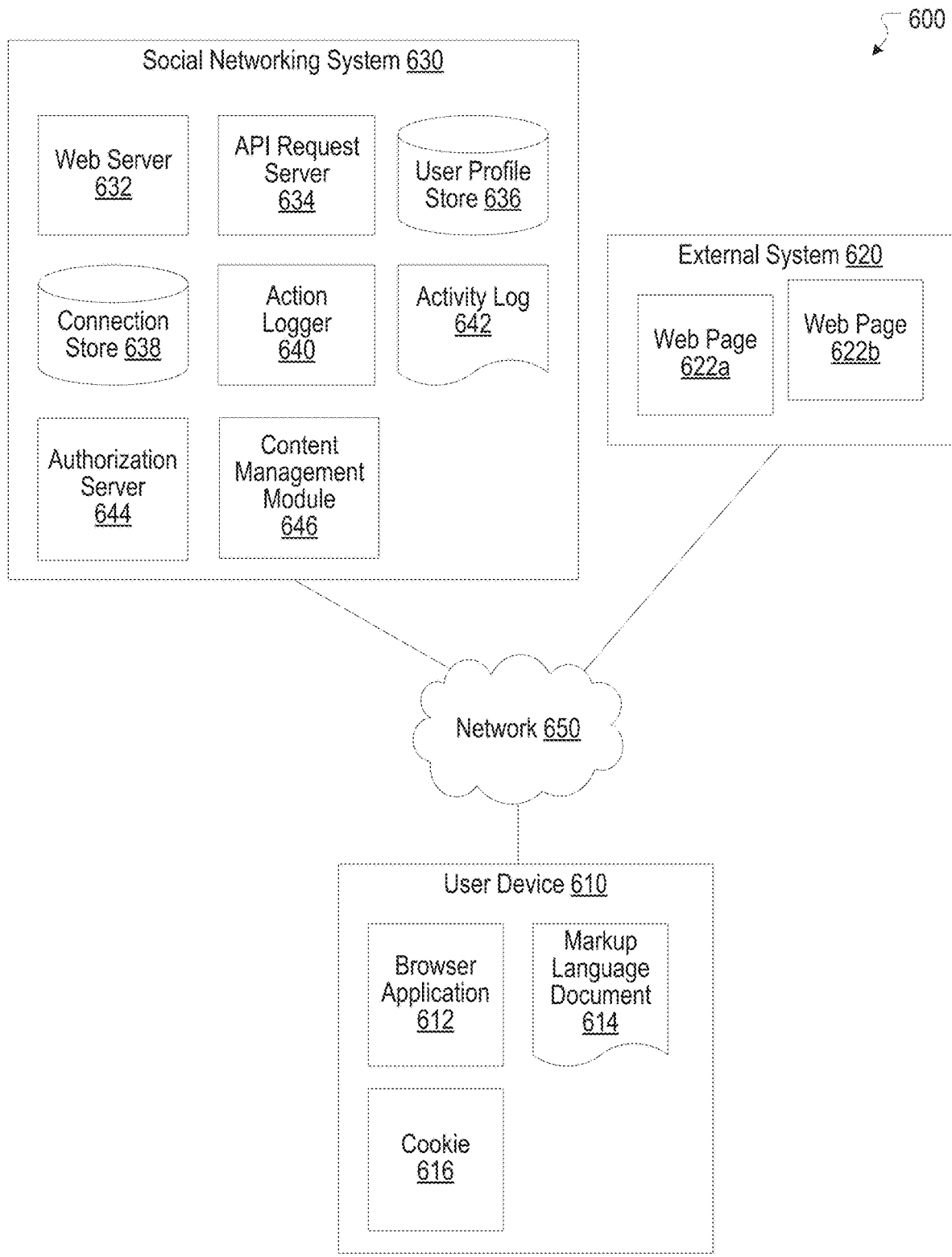
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content management module 646. The content management module 646 can, for example, be implemented as the content management module 102, as discussed in more detail herein. As discussed previously, it should be appreciated that there can be many variations or other possibilities. For example, in some embodiments, one or more functionalities of the content management module 646 can be implemented in the user device 610.

Hardware Implementation

Figure 7:
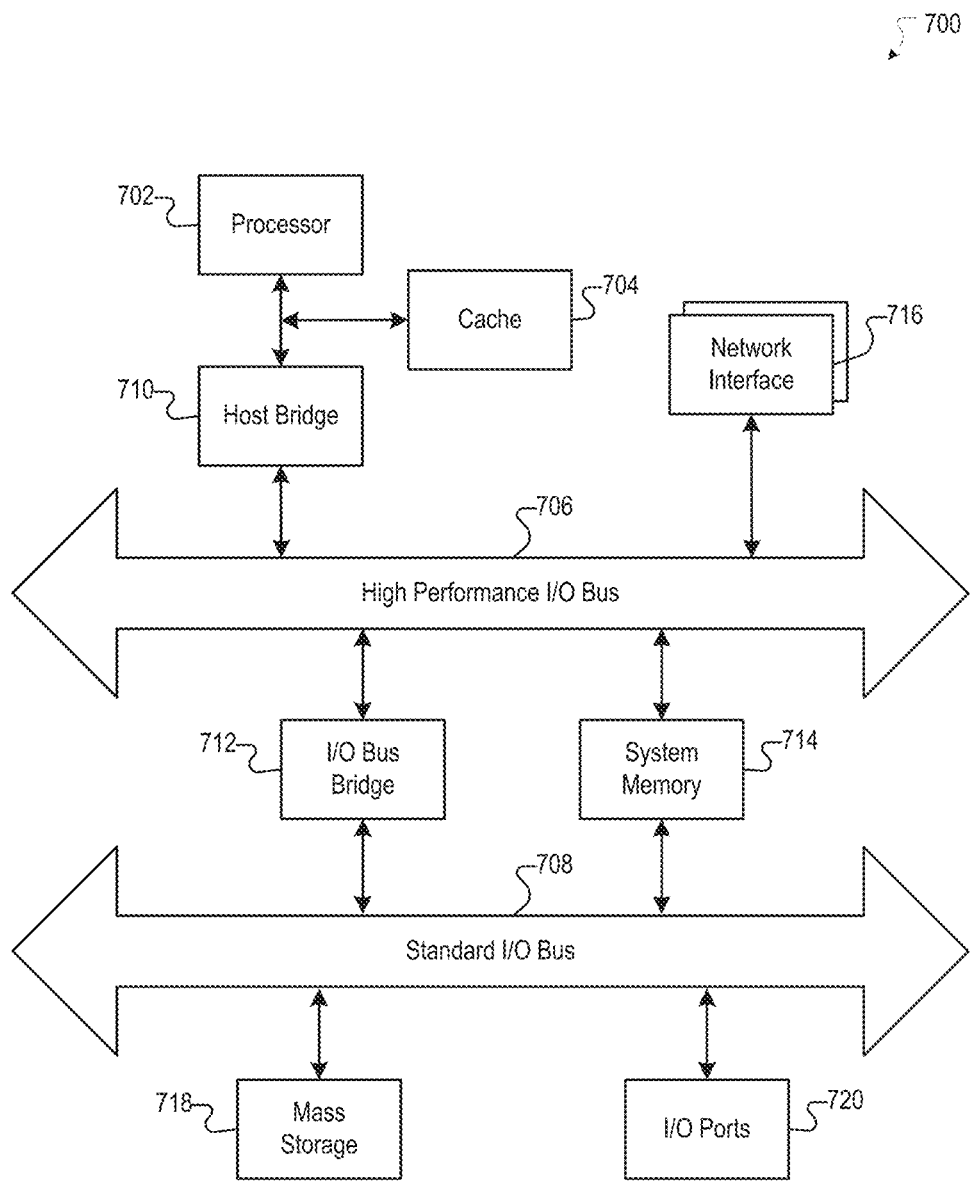
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, by a computing system, a first content item uploaded by a first user;
   updating, by the computing system, content ownership information to associate the first content item with the first user;
   performing, by the computing system, content match processing to determine a number of unauthorized uses of the first content item, wherein the performing comprises:
   generating, by the computing system, a first fingerprint associated with a time domain or a frequency domain based on the first content item; and
   identifying, by the computing system, matches between the first content item and portions of a plurality of content items based on a comparison of the first fingerprint and a plurality of fingerprints generated based on the portions of the plurality of content items;
   ranking, by the computing system, the first content item among content items at least partially owned by the first user based on the number of unauthorized uses of the first content item in comparison with respective numbers of unauthorized uses of the content items to generate a ranked list of content items with unauthorized uses for the first user;
   determining, by the computing system, revenue associate with the first content item based on satisfaction of payment conditions associated with the first content item, wherein the payment conditions correspond with a plurality of geographic regions, and wherein the payment conditions include a first payment condition for a first geographic region based on views of advertisements associated with the first content item by users in the first geographic region and a second payment condition for a second geographic region based on clicks of the advertisements associated with the first content item by users in the second geographic region;
   providing, by the computing system, the first user with content item analytics pertaining to the first content item in a content item analytics interface comprising the ranked list in a first window of a plurality of windows and a list of the content items at least partially owned by the first user in a second window of the plurality of windows, wherein the plurality of windows in the content item analytics interface are simultaneously presented, present content item analytics, and are links to additional information associated with the content item analytics, and wherein content items listed in the plurality of windows are links to additional information associated with the content items;
   providing, by the computing system, information associated with scope of rights held by the first user for the list of content items in the second window based on a first interaction with the second window; and
   providing, by the computing system, information associated with scope of rights, generated revenue, and unauthorized uses for the first content item of the content items in the second window based on a second interaction with the first content item of the content items in the second window, wherein the information associated with the generated revenue includes the revenue associated with the first content item.

2. The computer-implemented method of claim 1, wherein the content item analytics comprises options for a plurality of remedial actions associated with the unauthorized uses of the first content item.

3. The computer-implemented method of claim 1, wherein the revenue content item analytics comprise revenue information for the plurality of geographic regions.

4. The computer-implemented method of claim 1, wherein the content item payment conditions associated with the first content item are based on the content ownership information, and wherein the content ownership information provides the payment conditions for content items associated with the first user.

5. The computer-implemented method of claim 1, wherein the content ownership information comprises details regarding rights of the first user in the first content item.

6. The computer-implemented method of claim 1, wherein the content ownership information comprises details regarding other content owners that own rights in the first content item.

7. The computer-implemented method of claim 1, wherein the unauthorized use information comprises unauthorized use information for the plurality of geographic regions.

8. The computer-implemented method of claim 1, wherein the content item analytics comprise dispute results information for the first content item.

9. The computer-implemented method of claim 1, wherein the ranking the first content item among content items at least partially owned by the first user based on the number of unauthorized uses further comprises:
ranking the first content item based on at least one of a number of disputes associated with at least one of the content items or revenue associated with the content items.

10. A system comprising:
at least one processor; and
a memory storing instructions that, when executed by the at least one processor, cause the system to perform a method comprising:
receiving a first content item uploaded by a first user;
updating content ownership information to associate the first content item with the first user; and
performing content match processing to determine a number of unauthorized uses of the first content item, wherein the performing comprises:
generating a first fingerprint associated with a time domain or a frequency domain based on the first content item; and
identifying matches between the first content item and portions of a plurality of content items based on a comparison of the first fingerprint and a plurality of fingerprints generated based on the portions of the plurality of content items;
ranking the first content item among content items at least partially owned by the first user based on the number of unauthorized uses of the first content item in comparison with respective numbers of unauthorized uses of the content items to generate for the first user a ranked list of content items associated with unauthorized uses;
determining revenue associated with the first content item based on satisfaction of payment conditions associated with the first content item, wherein the payment conditions correspond with a plurality of geographic regions, and wherein the payment conditions include a first payment condition for a first geographic region based on views of advertisements associated with the first content item by users in the first geographic region and a second payment condition for a second geographic region based on clicks of the advertisements associated with the first content item by users in the second geographic region;
providing the first user with content item analytics pertaining to the first content item in a content item analytics interface comprising the ranked list in a first window of a plurality of windows and a list of the content items at least partially owned by the first user in a second window of the plurality of windows, wherein the plurality of windows in the content items analytics interface are simultaneously presented, present content item analytics, and are links to additional information associated with the content item analytics, and wherein content items listed in the plurality of windows are links to additional information associated with the content items;
providing information associated with scope of rights held by the first user for the list of content items in the second window based on a first interaction with second window; and
providing information associated with scope of rights, generated revenue, and unauthorized uses for the first content item of the content items in the second window based on a second interaction with the first content item of the content items in the second window, wherein the information associated with the general revenue includes the revenue associated with the first content item.

11. The system of claim 10, wherein the content item analytics interface comprises options for a plurality of remedial actions associated with the unauthorized uses of the first content item.

12. The system of claim 10, wherein the content item analytics comprise revenue information for the plurality of geographic regions.

13. The system of claim 10, wherein the payment conditions associated with the first content item are based on the content ownership information, and wherein the content ownership information provides the payment conditions for content items associated with the first user.

14. The system of claim 10, wherein the content ownership information comprises details regarding the rights of the first user in the first content item.

15. A non-transitory computer-readable storage medium including instructions that, when executed by at least one processor of a computing system, cause the computing system to perform a method comprising:
receiving a first content item uploaded by a first user;
updating content ownership information to associate the first content item with the first user; and
performing content match processing to determine a number of unauthorized uses of the first content item, wherein the performing comprises:
generating a first fingerprint associated with a time domain or a frequency domain based on the first content item; and
identifying matches between the first content item and portions of a plurality of content items based on a comparison of the first fingerprint and a plurality of fingerprints generated based on the portions of the plurality of content items;

ranking the first content item among content items at least partially owned by the first user based on the number of unauthorized uses of the first content item in comparison with respective numbers of unauthorized uses of the content items to generate for the first user a ranked list of content items associated with unauthorized uses;

determining revenue associated with the first content item based on satisfaction of payment conditions associated with the first content item, wherein the payment conditions correspond with a plurality of geographic regions, and wherein the payment conditions include a first payment condition for a first geographic region based on views of advertisements associated with the first content item by users in the first geographic region and a second payment condition for a second geographic region based on clicks of the advertisements associated with the first content item by users in the second geographic region;

providing the first user with content item analytics pertaining to the first content item in a content item analytics interface comprising the ranked list in a first window of a plurality of windows and a list of the content items at least partially owned by the first user in a second window of the plurality of windows, wherein the plurality of windows in the content item analytics interface are simultaneously presented, present content item analytics, and are link to additional information associated with the content item analytics, and wherein content items listed in the plurality of windows are links to additional information associated with the content items;

providing information associated with scope of rights help by the first user for the list of content items in the second window based on a first interaction with the second window; and providing information associated with scope of rights, generated revenue, and unauthorized uses for the first content item of the content items in the second window based on a second interaction with the first content item of the content items in the second window, wherein the information associated with the general revenue includes the revenue associated with the first content item.

16. The non-transitory computer-readable storage medium of claim 15, wherein the content item analytics comprises options for a plurality of remedial actions associated with the unauthorized uses of the first content item.

17. The non-transitory computer-readable storage medium of claim 15, wherein the content item analytics comprise revenue information for the plurality of geographic regions.

18. The non-transitory computer-readable storage medium of claim 15, wherein the payment conditions associated with the first content item are based on the content ownership information, and wherein the content ownership information provides the payment conditions for content items associated with the first user.

19. The non-transitory computer-readable storage medium of claim 15, wherein the content ownership information comprises details regarding the rights of the first user in the first content item.

* * * * *